(12) United States Patent
Ferrigan

(10) Patent No.: US 6,840,554 B2
(45) Date of Patent: Jan. 11, 2005

(54) BUMPER ASSEMBLY FOR VEHICLE

(76) Inventor: Paul Ferrigan, 1001 Vine St., Liverpool, NY (US) 13088-4523

( * ) Notice: Subject to any disclaimer, the term of this patent is extended or adjusted under 35 U.S.C. 154(b) by 0 days.

(21) Appl. No.: 10/449,467

(22) Filed: May 30, 2003

(65) Prior Publication Data
US 2004/0041417 A1 Mar. 4, 2004

Related U.S. Application Data

(63) Continuation-in-part of application No. 10/230,357, filed on Aug. 28, 2002.

(51) Int. Cl.[7] .............................................. B60R 19/48
(52) U.S. Cl. ..................... 293/117; 293/155; 224/512
(58) Field of Search ................. 293/117, 106, 293/116, 142, 143, 155; 224/319, 491, 497, 320, 512, 513, 514, 516, 519

(56) References Cited

U.S. PATENT DOCUMENTS

| | | |
|---|---|---|
| 3,176,903 A | 4/1965 | Farley |
| 4,099,760 A | 7/1978 | Mascotte et al. |
| 4,125,214 A | 11/1978 | Penn |
| 4,239,253 A | 12/1980 | Golze |
| 4,610,458 A * | 9/1986 | Garnham ..................... 280/495 |
| 4,674,933 A * | 6/1987 | Brown ........................ 414/24.6 |
| 4,775,282 A * | 10/1988 | Van Vliet .................... 414/462 |
| 4,834,273 A * | 5/1989 | Cimino ..................... 224/42.21 |
| 4,950,010 A * | 8/1990 | Denny ........................ 293/117 |
| 4,989,765 A * | 2/1991 | Huebner ..................... 224/485 |
| 5,427,289 A * | 6/1995 | Ostor ......................... 224/499 |
| 5,478,124 A * | 12/1995 | Warrington et al. ......... 293/125 |
| 6,099,061 A | 8/2000 | Gessay |
| 6,398,276 B1 * | 6/2002 | Smith ......................... 293/142 |
| 6,428,031 B1 * | 8/2002 | McCoy et al. .............. 280/495 |
| 6,540,277 B2 * | 4/2003 | McCoy et al. .............. 293/117 |
| 6,579,055 B1 * | 6/2003 | Williams .................... 414/462 |
| 6,685,244 B2 * | 2/2004 | McCoy et al. .............. 293/102 |

* cited by examiner

*Primary Examiner*—D. Glenn Dayoan
*Assistant Examiner*—Greg Blankenship
(74) *Attorney, Agent, or Firm*—McCormick, Paulding & Huber LLP

(57) ABSTRACT

A unibody style automobile has bumper attachment pads for a crash bar and bumper cover assembly of conventional configuration. Removal of these bumper components provides access to these pads for a load carrier or beam that defines two coupling connections for a frame selected from a plurality of frames, each designed for a different load. All the frames have one fixed slide bolt received in one of the two sockets in the beam. A second bolt provides a very secure attachment point for each of these frames.

5 Claims, 14 Drawing Sheets

BUMPER ASSEMBLY FOR VEHICLE

CROSS REFERENCE TO RELATED APPLICATIONS

This application is a continuation-in-part application of a prior application Ser. No. 10/230,357 filed on Aug. 28, 2002 entitled "Load Carrier for Vehicle", which is incorporated by reference.

FIELD OF THE INVENTION

This invention relates generally to load carriers for use at the rear of a vehicle, and deals more particularly with a bumper assembly and load carrying device adapted for mounting to the vehicle by a unique carrying beam.

BACKGROUND OF THE INVENTION

The present invention, is intended for use with a present day automobile of the type having a conventional rear bumper which includes a decorative shock absorbing cover as well as a structural support member to which the cover is mounted. Such a structural bumper support is generally mounted to spaced attachment pads on the vehicle body. The present invention calls for substituting a unique load carrying beam for the structural support so as to provide a spaced support lands constructed and arranged to fit the spaced attachment pads in the vehicle body. The conventional bumper components, in the form of the decorative shock absorbing cover and the underlying structural support, are remounted to the vehicle after mounting the beam to the said attachment pads of the vehicle.

The above mentioned beam is provided with at least two rearwardly open sockets that are arranged in spaced vertical relationship to the support lands. The sockets are further provided inwardly of these lands so as to be spaced apart approximately half the horizontal distance between the vehicle attachment pads.

A typical load carrying device in the form of a bicycle rack for example, comprises a frame which is fitted with a slide bolt adapted to be received in one of the sockets, and to be locked in place by angular rotation of the frame relative to the socket. The socket is fixed relative to the vehicle as described above. When the frame or bicycle rack is rotated into position, a second slide bolt provided in a second portion of the frame, is aligned with the second of the two sockets to be slid into place into the second socket defining structure so as to anchor the frame to the vehicle.

Other frames can be configured for supporting other loads, such as skis, snowboards, and other personal sports related equipment.

A conventional trailer hitch is also provided as the load carrying device, in which case a trailer of conventional geometry can be secured to a load carrying device by providing a conventional trailer hitch ball for example, on a frame secured to the vehicle by the two slide bolts in the frame structure designed along the lines of the above-described bicycle rack frame.

Other variations of load carrying device frames are within the scope of the present invention as well. For example, a platform suitable for use as a table might be provided as the frame. Alternatively, a storage box can be provided on such a table or on its own frame as adapted for supporting such a storage box. Still further possibilities for the frame configuration are apparent to those of ordinary skill in the art to accommodate to fit particular sports related or recreational related activities.

DETAILED DESCRIPTION

Figure 2:
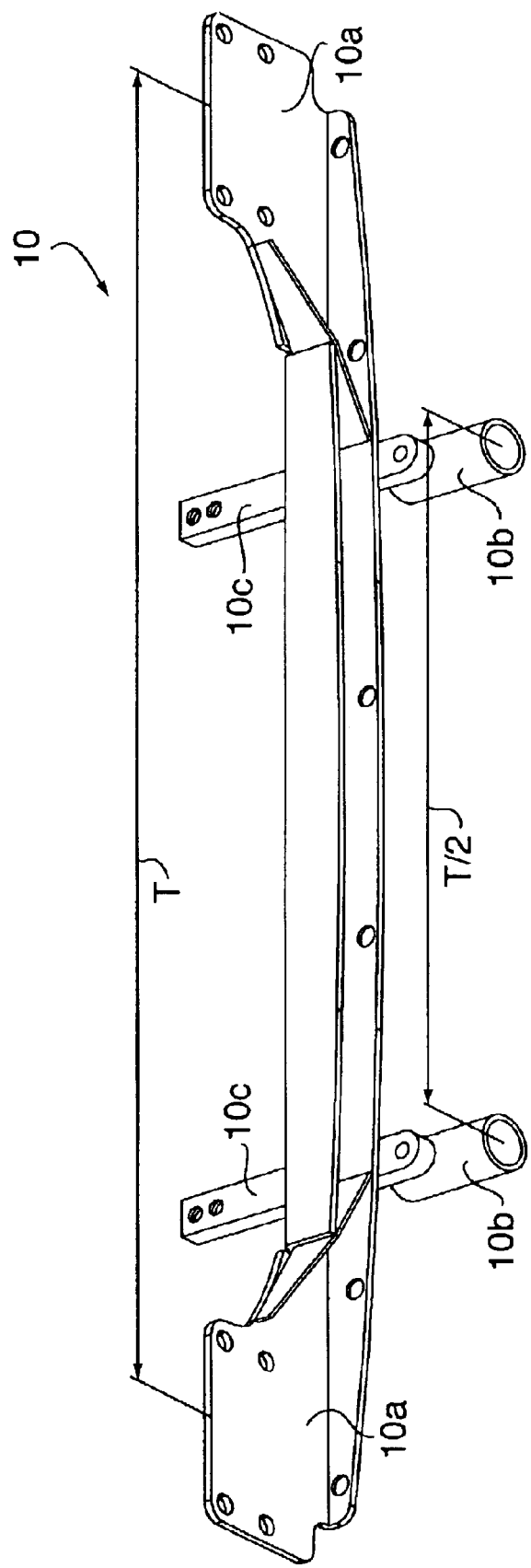
FIG. 2 shows a beam constructed in accordance with the present invention, such beam having spaced lands constructed and arranged so as to fit the spaced attachment pads in the vehicle body. The beam of FIG. 2 further includes at least two rearwardly opened sockets arranged below the lands and spaced inwardly thereof.
Figure 3:
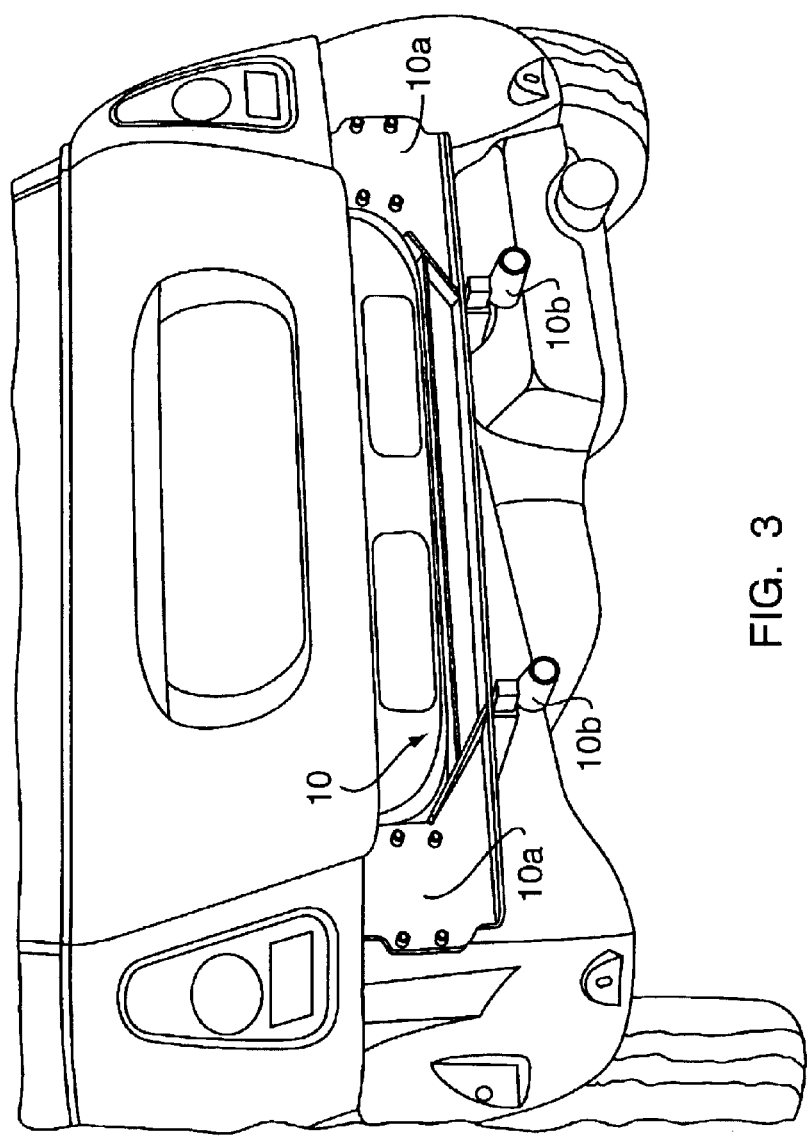
FIG. 3 shows the beam of FIG. 2 installed on the vehicle.

Turning now to the drawings in greater detail, and referring particularly to FIG. 2, a beam 10 is shown having spaced apart lands $10_A$, $10_A$ which lands are so constructed and arranged as to fit the spaced attachment pads in the vehicle body to which the device of the present invention is to be attached. FIG. 3 shows four threaded bolts securing each of these lands to the vehicle body.

The beam 10 has in addition to the lands $10_A$, $10_A$ rearwardly the open sockets $10_B$, $10_B$ arranged below and affect laterally from the lands. These sockets are spaced apart horizontally by a distance of approximately one-half the lateral spacing between the lands. Preferably, this spacing is in the range between one-half the springs T between the lands (T/2) spacing T and one-fourth that value (T/4).

Figure 4:
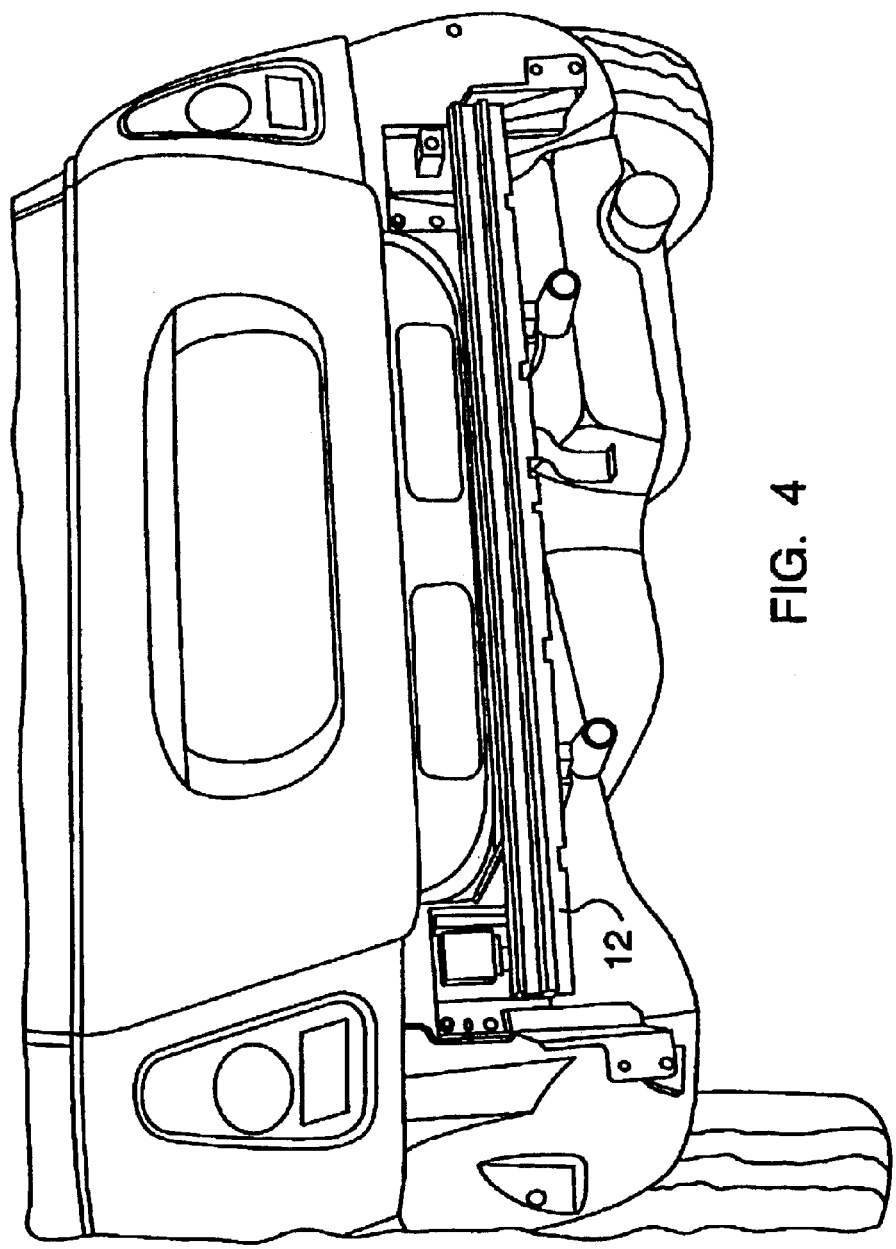
FIG. 4 shows the bumper support provided on the vehicle, and more particularly on the beam illustrated in FIGS. 2 and 3.

As mentioned previously, the vehicle bumper is conventional, and has a decorative crash absorbing plastic cover portion, which is removable as suggested in FIG. 4, and which is supported by an underlying crash bar or structural sport member 12. This member 12, as shown in FIG. 4, can be mounted onto the lands of the beam 10 as shown in FIG. 4 so as to allow the decorative rear bumper of the vehicle to be resecured to the vehicle once the beam has been mounted to the vehicle.

Figure 1:
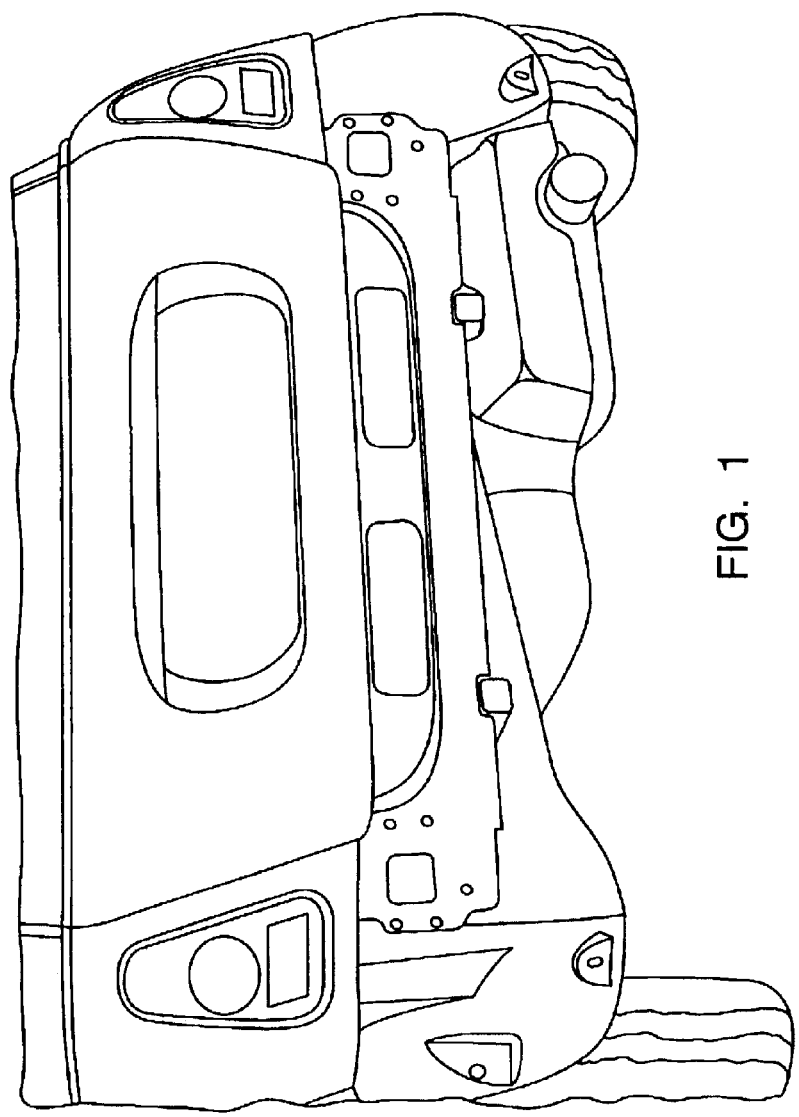
FIG. 1 shows an automobile or vehicle of the type having laterally spaced attachment pads for receiving a bumper support or crash bar, which support is typically fitted with means for attaching a decorative shock absorbent bumper cover. Such a cover is shown in FIG. 5. A structural support adapted to hold such a bumper cover is depicted in FIG. 4.

In accordance with the method of the present invention the crash bar support portion of the bumper as well as the plastic decorative cover portion thereof are removed as suggested in FIG. 1. The beam 10 of the present invention is then secured to the vehicle as described above, and as best shown in FIG. 3. The vehicle also includes structural members conventionally formed in the basic "unibody" construction. These structural members are provided by the manufacturer behind the attachment pads shown in FIG. 1. Further structural members can be seen in the vehicle as suggested by the square cross sectional members which are rearwardly open and extend from the underside of the vehicle as best shown in FIG. 1. These further members are utilized in the preferred embodiment shown in the drawings by providing bars 10c projecting oppositely to the rearwardly open socket defining portions of beam 10. Thus, in the preferred embodiment, advantage is taken of the structurally secure portions of the vehicles unibody construction. The purpose of the beam 10 is to provide a link between the vehicle and a load carrying device to be described. Such a load carrying device may comprise a ski rack, a bicycle rack, a luggage carrier or a platform for a storage box that also serves as a table. A trailer can also be accommodated with a frame of appropriate configuration (see FIG. 6).

Figure 5:
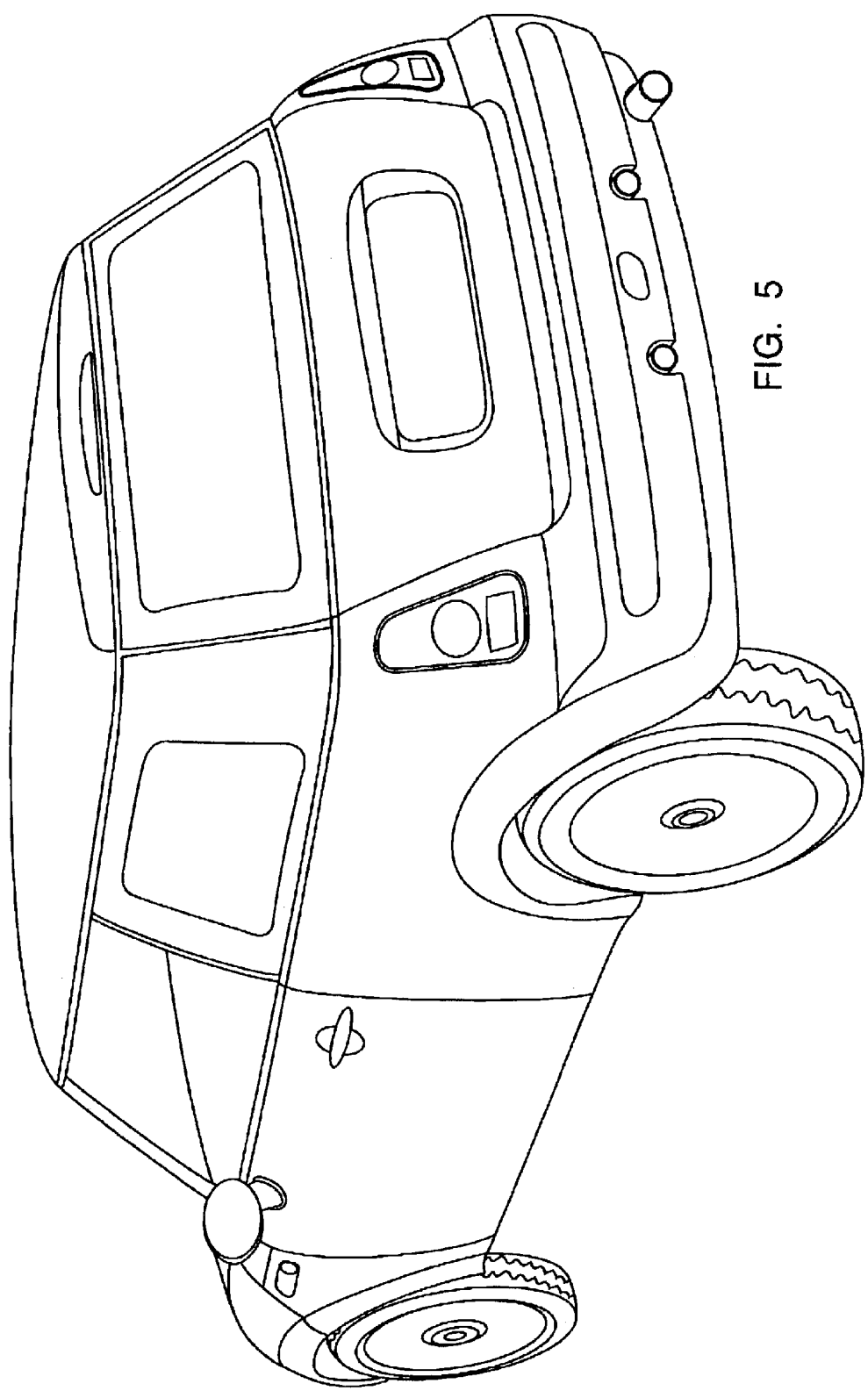
FIG. 5 shows the vehicle after reattachment of the bumper cover, the only part of the beam of the present invention, which is visible being the rearwardly opened sockets.

In further accordance with the present invention, the plastic bumper cover is reattached as shown in FIG. 5 to the structural support or crash bar shown in FIG. 4.

Figure 6:
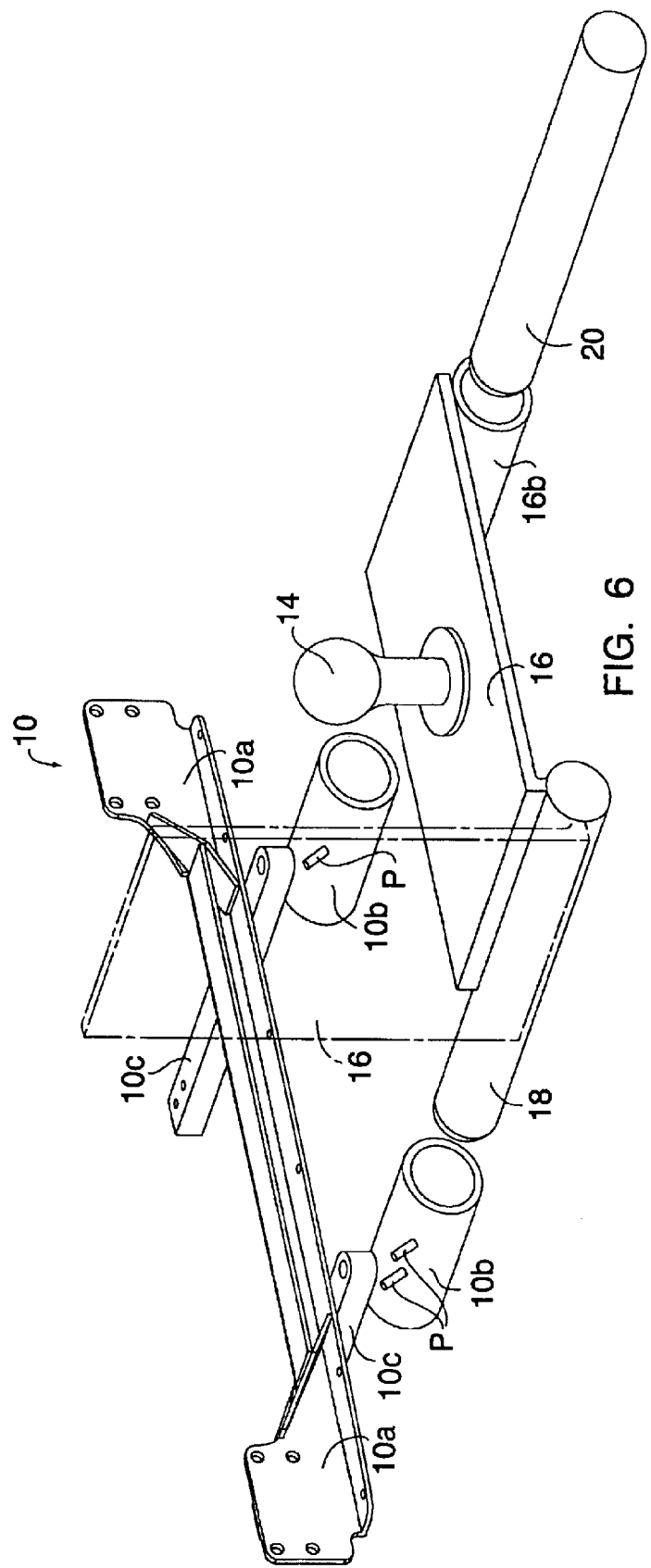
FIG. 6 is a perspective view showing a frame in exploded relationship to a carrier beam with the two slide bolts or pins for securing these components. The frame has a conventional ball socket for receiving a conventional trailer and is shown in an initial broken line position for insertion of the primary slide bolt.
Figure 7:
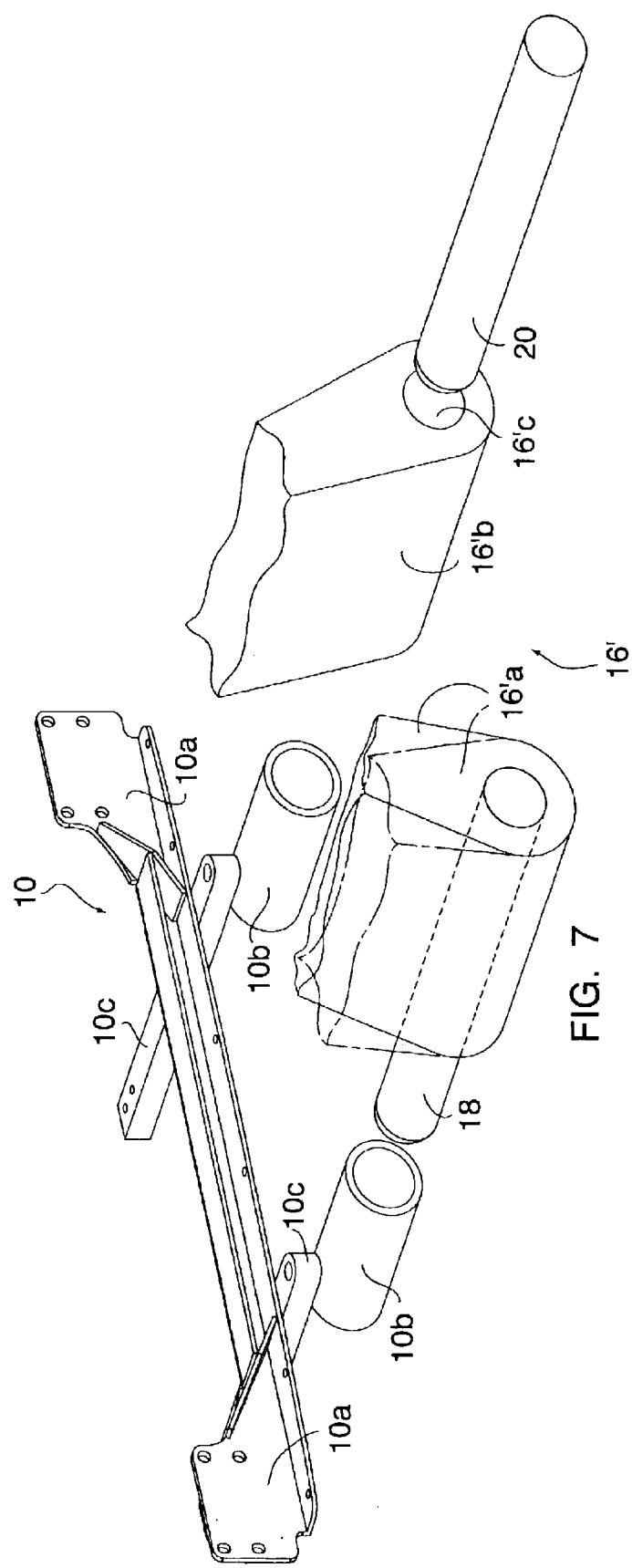
FIG. 7 is a perspective view of another frame, for use in carrying bicycles or skis for example, being assembled with the carrier beam socket as in the previous view.

FIGS. 6 and 7 illustrate the complementary slide bolt and receptive socket configuration used to couple the load carrying device or devices to the above-described support beam 10. Basically, a frame structure is provided that is dictated by the particular load to be carried, and in FIG. 6 a trailer hitch ball 14 is shown mounted on a frame which preferably takes the form of plate 16 that is secured to a primary slide bolt or pin 18 so that the frame or plate 16 can be oriented in the vertical position shown in broken lines in FIG. 6, allowing the slide bolt 18 to be inserted in the socket $10_B$. The slide bolt 18 is preferably provided with a cam slot that cooperates with one or more pins inside the socket $10_B$, so the rotation of the frame from the vertical broken line position shown to the solid line position shown will lock these components in assembled relationship to one another. Further, and in order to assure that the plate 16 remains horizontal when so assembled, a secondary pin 20 is provided in a socket portion $16_B$ in the frame 16 so as to be received in the opposite socket $10_B$ in the beam 10. This pin 20 also rotates so as to lock the pin 20 and hence the frame 16 in position relative to the support beam 10.

FIG. 7 shows a similar arrangement, but the frame 16' is preferably in the form of an A-frame with angularity related legs $16'_A$ and $16'_B$. Here again, the primary slide bolt or pin 18 is mounted in the lower end of the leg $16'_A$ and the entire frame 16' can be rotated through 90° or something less than 90° to lock the primary pin 18 in place. A secondary pin 20 is inserted in an opening $16'_C$ so as to secure the frame 16 in assembled relationship to the carrier beam 10.

Figure 8:
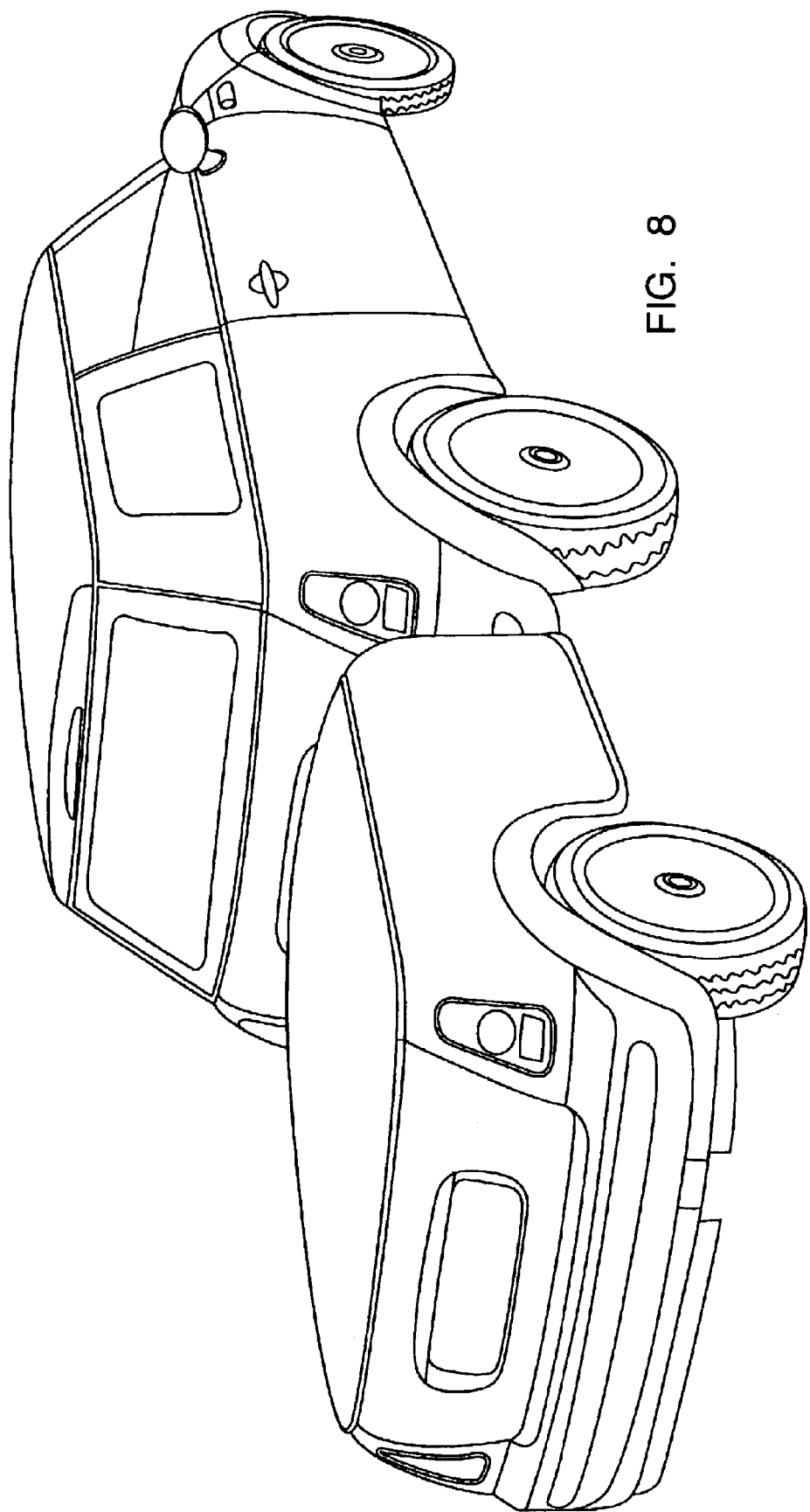
FIG. 8 shows a trailer such as that referred to with reference to FIG. 6.
Figure 9:
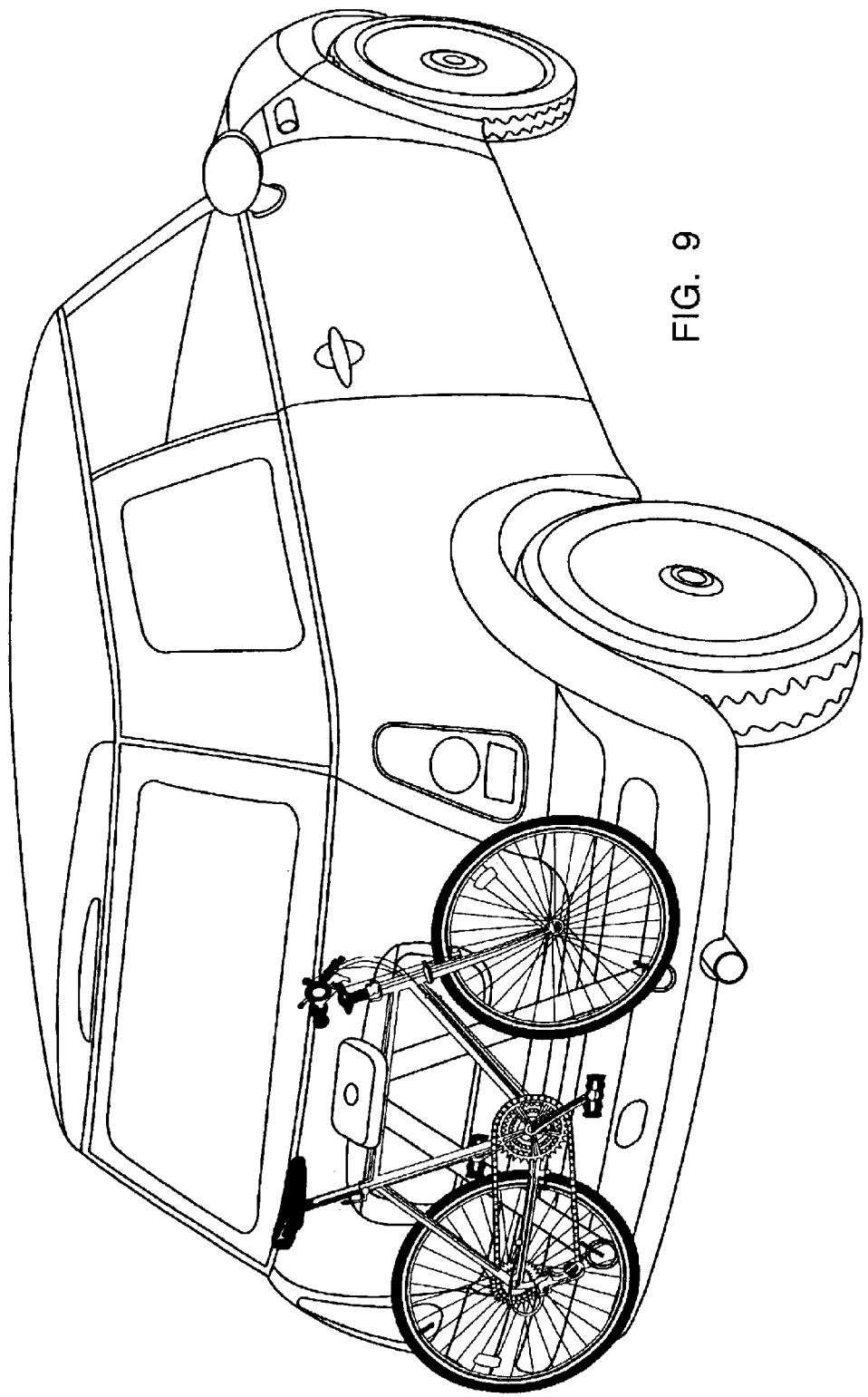
FIG. 9 shows a bicycle rack such as that referred to with reference to FIG. 7.
Figure 10:
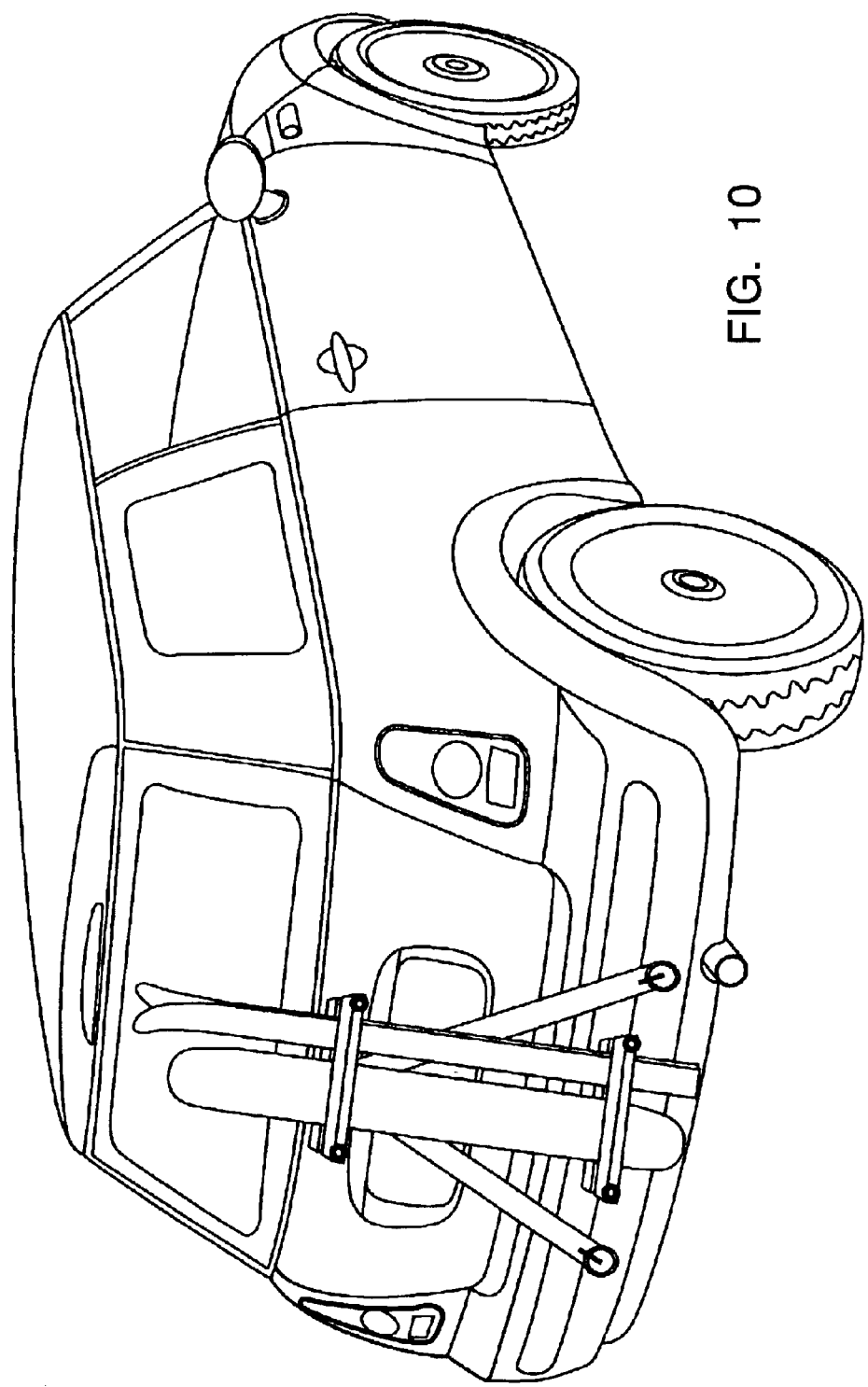
FIG. 10 shows a ski rack such as that referred to with reference to FIG. 7.
Figure 11:
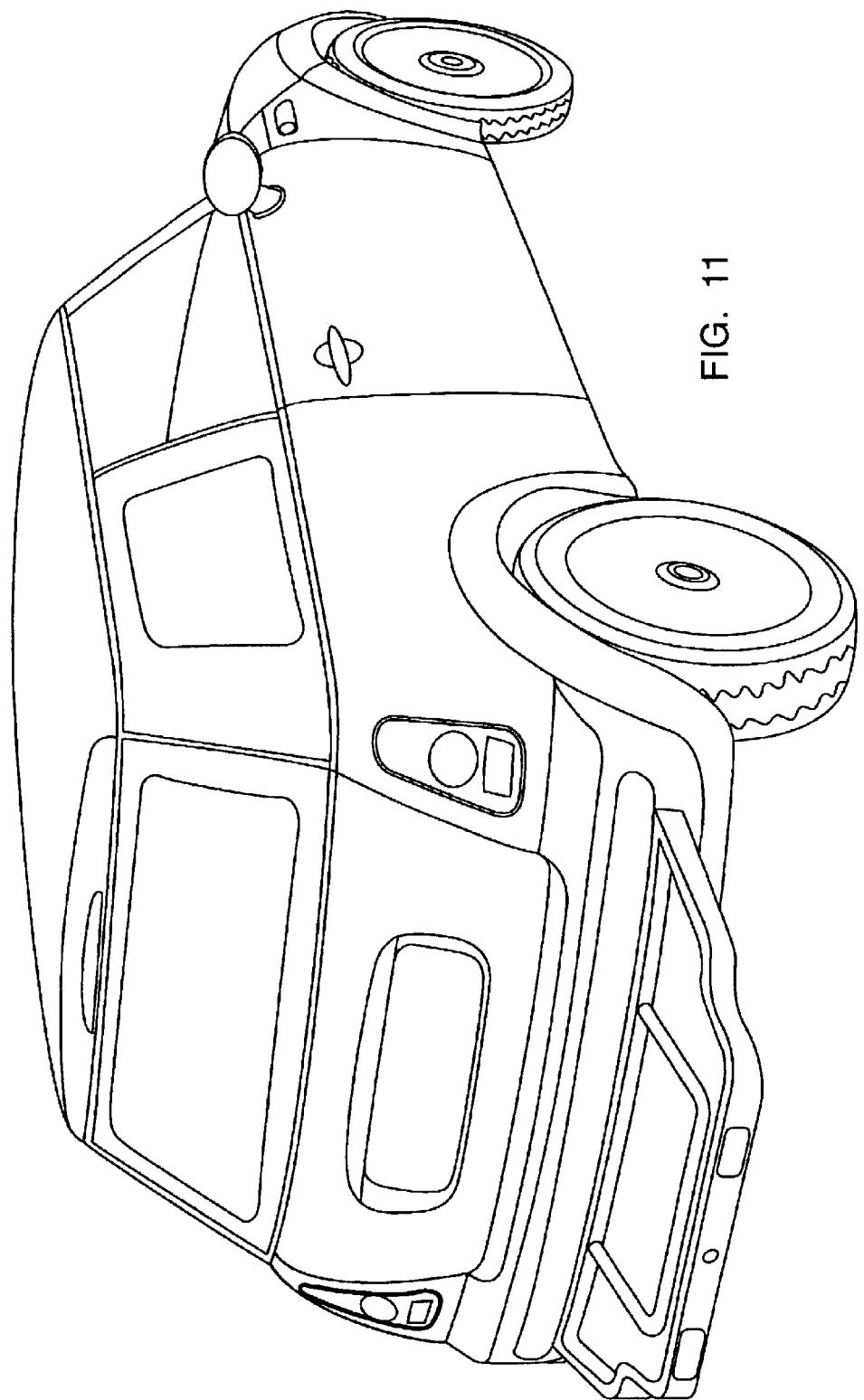
FIG. 11 shows a support platform or table such as that described below with reference to FIG. 6.
Figure 12:
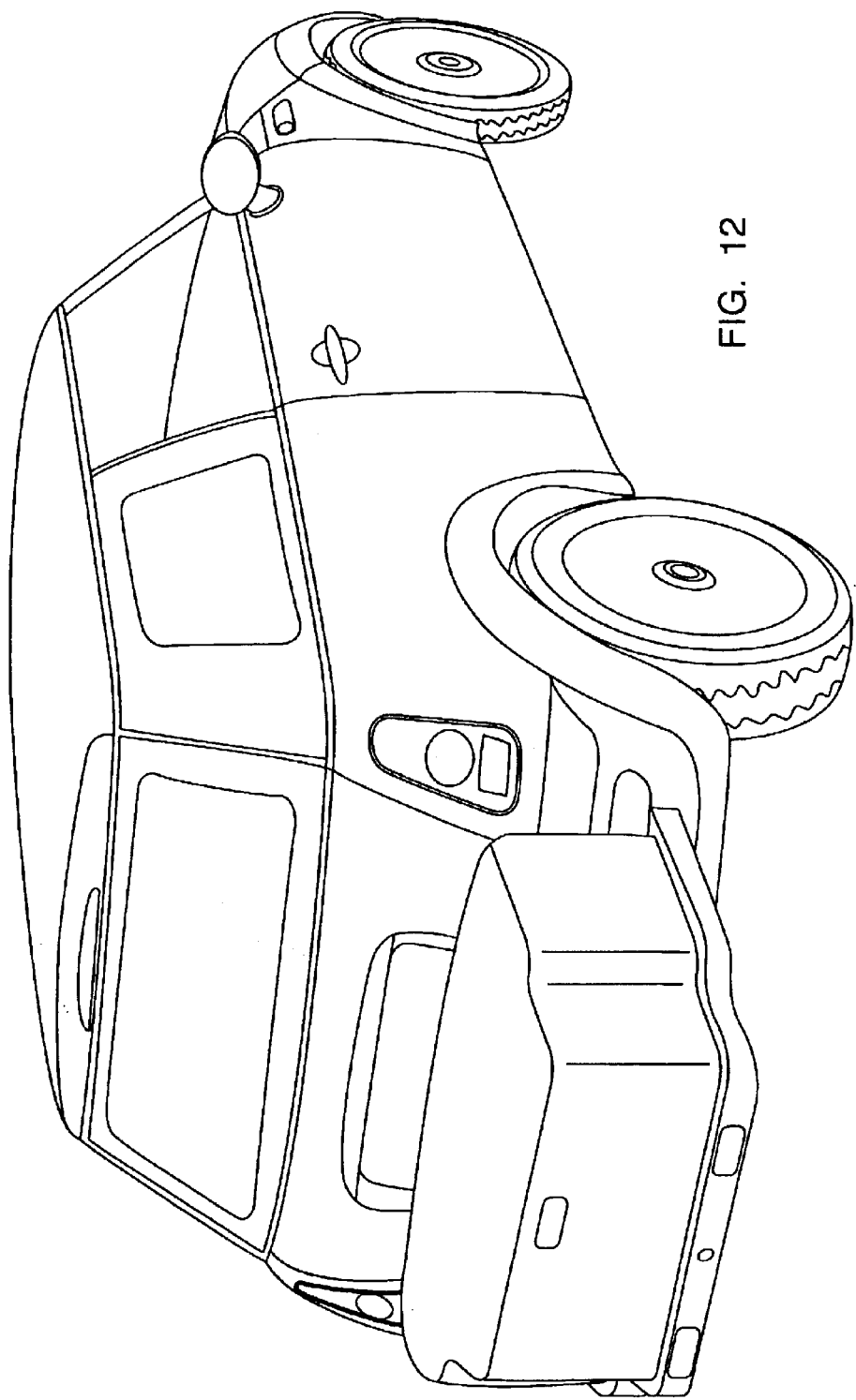
FIG. 12 is similar to FIG. 11 but shows a storage box on the platform.
Figure 13:
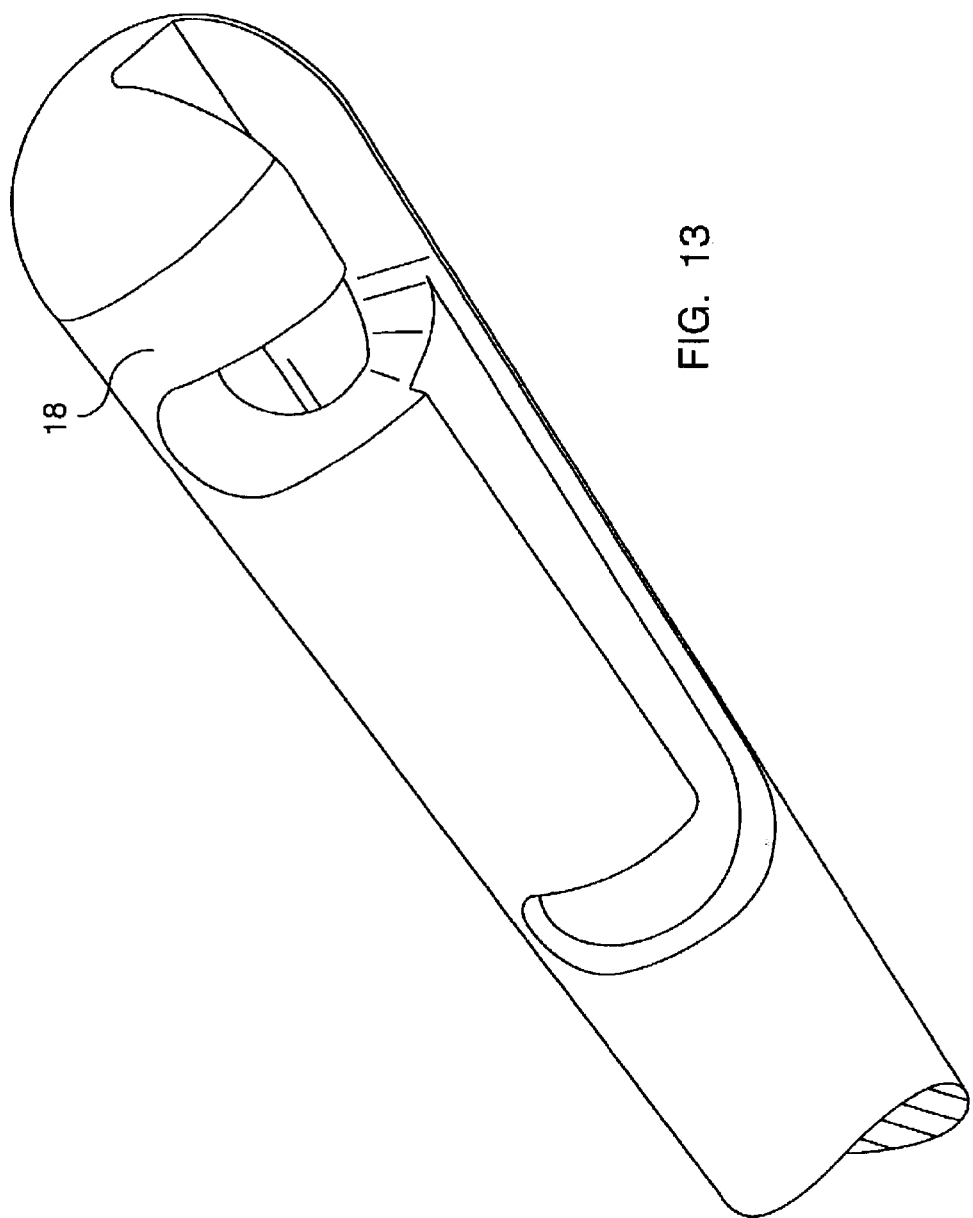
FIG. 13 shows in detail the cam slots defined in the primary pin or slide bolt of FIGS. 6 and 7.

FIGS. 8 and 9 show respectively, and admittedly in somewhat schematic fashion, the load to be carried by the frames illustrated in FIGS. 6 and 7 respectively.

Figure 14:
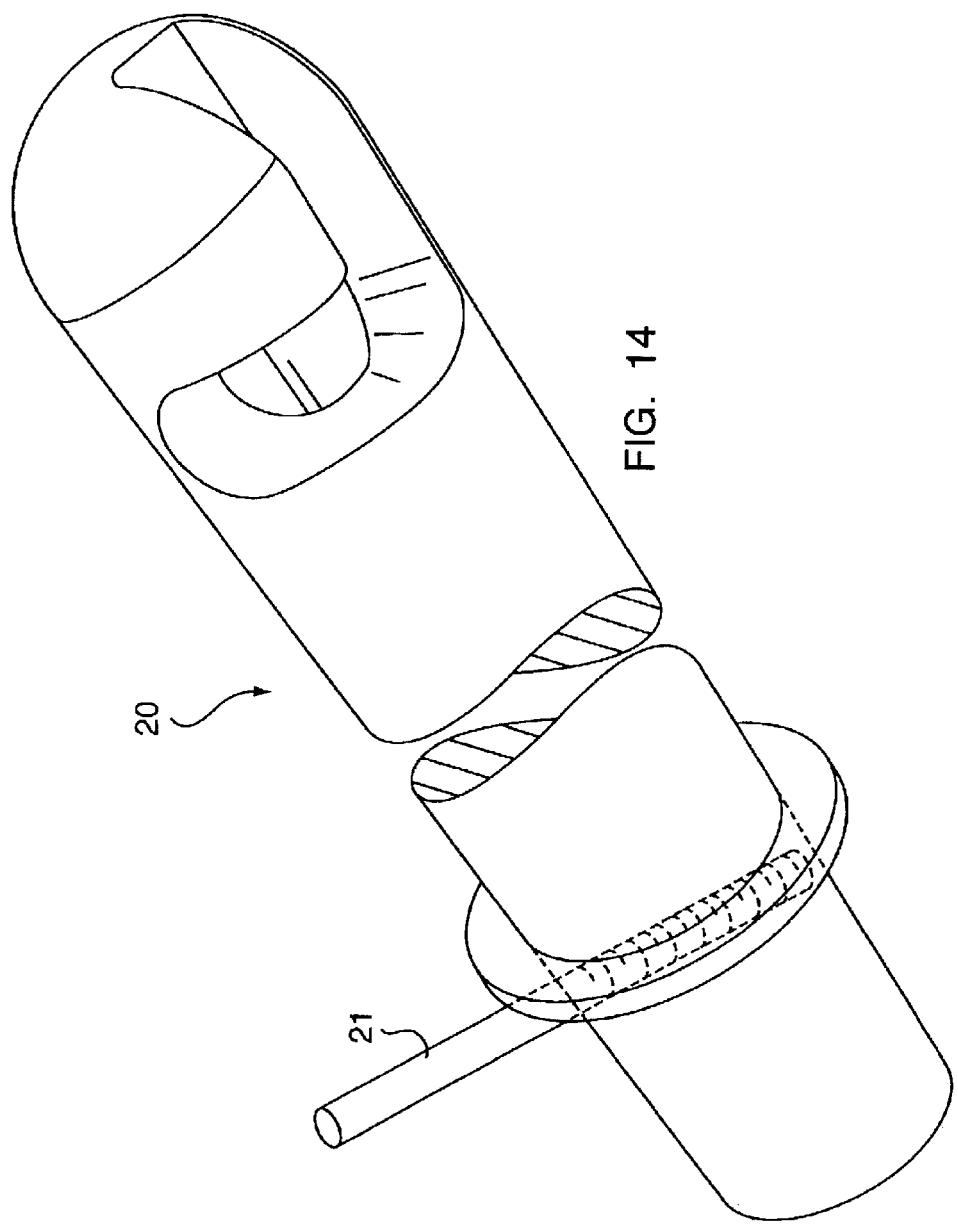
FIG. 14 is a perspective view of the secondary slide bolt shown in FIG. 6 at 20.

FIG. 14 shows the slide bolt 20 of FIG. 6 in greater detail, and illustrates the single cam slot required in this "separable" coupling component. Only one pin need be provided in its socket of the bar or beam 10. This bolt 20 received in an opening or bore provided for it in the frame 16, 16 and is also received in that socket. Rotation of this slide bolt is facilitated by a handle 21. A tee shaped handle, or other shaped knob can be provided in lieu of the handle 21 shown Other variations will be apparent from the preferred embodiment described above. For example, the auto manufacturer (OEM) may build the vehicle wit the beam 10 installed as original equipment. The OEM bumper support described above, and shown prior to its removal in FIG. 4, can be omitted altogether. The external bumper cover would be installed directly on beam 10, by the OEM rather than installed on such a support as an after-market installation in the manner described, and shown in FIGS. 1–4.

Another variation is to provide two primary bolts rather than one as shown in FIG. 14. In place of the secondary bolt 20, the frame would have both socket openings such as shown at 16a in FIG. 6 to receive both slide bolts at the same time. Lock pins would be required to secure both primary slide bolts in place in a manner similar to that now used in conventional receivers. The more conventional square or non-round sockets would then provide additional structural strength and rigidity for any load to be carried on a frame fitted with such a twin receiver geometry.

In accordance with the present invention other frames can be adapted for carrying loads of varieties similar to the trailer and bicycle load described above. For example, frames with the same primary and secondary pin configurations described above can be devised for loads of different types; including tables, storage boxes, fishing pole holders, skis and snowboards, and even such recreational equipment as umbrellas and tables. In summary, the present invention has two aspects, one the mounting of the support beam to the vehicle unibody pads that are also used to support the bumper, and in its second aspect comprises a frame selected from a plurality of unique frame. Each frame has at least one primary slide bolt or pin, and a secondary slide bolt or pin movably mounted in that frame such that the frame can be secured by the slide bolts to the beam.

In light of the above, it is to be understood that within the scope of the appended claims, the invention may be practiced otherwise and as specifically described.

What is claimed is:

1. A bumper assembly for a vehicle, comprising; a crash bar mounted to laterally spaced attachment pads in the vehicle, said crash bar having at least two coupling components spaced inwardly of said pads, and a load carrying frame fitted with at least two mating components for coupling to said at least two coupling components respectively, said frame selected from a plurality of frames each constructed and arranged to carry a load of predetermined size and shape, at least one said mating component including a projecting bolt receivable by one of said coupling components defined by said crash bar as an opening.

2. The bumper assembly of claim 1 further characterized by means for locking said one mating bolt in said socket.

3. The bumper assembly of claim 1 further characterized by means for restricting said slide bolt from sliding out of its socket.

4. The bumper assembly of claim 1 wherein another of said mating coupling components comprises a slide bolt received in an opening in said frame.

5. The bumper assembly of claim 3 wherein said means for restricting said slide bolt from sliding out of its socket comprises at least one pin in said opening said, and a cam slot defined by said bolt.

* * * * *